Patented June 5, 1934

1,961,229

UNITED STATES PATENT OFFICE 1,961,229

SOLUTIONS AND METHOD OF PREPARING SAME

Jean Ladrette, Peage-de-Roussillon, France, assignor to Du Pont Rayon Company, New York, N. Y., a corporation of Delaware No Drawing. Application January 13, 1931, Serial No. 508,554. In Great Britain May 3, 1930

6 Claims. (Cl. 134—79)

This invention relates to pigmented compositions of matter and more particularly to a process of preparing homogeneous and substantially stable pigmented solutions of cellulose derivatives suitable for use as varnishes, lacquers, spinning solutions, and the like.

The incorporation of pigments in the solutions of cellulosic derivatives, such as cellulose esters, for the purpose of imparting to them any desired color, or of modifying their aspect, is a current practice in the cellulose industry. In certain cases, for example, in the preparation of brilliant varnishes having a high covering power of colored films, or even of artificial fibers or filaments, the pigment incorporated must be extremely fine and must be very homogeneously distributed in the mass.

The process most generally used and mentioned in connection with the manufacture of such products is that which consists in thoroughly grinding the pigments and incorporating them mechanically in the solution to be colored. Particularly, it has been proposed to grind the pigments by means of grinding machinery adapted to give a colloidal fineness.

The solutions obtained by the above-described process may appear homogeneous and no visible sedimentation of the pigments is apparent. However, if they are kept for some time prior to being used, and if they are observed periodically with a microscope of suitable magnification, it is seen that the preparation gradually loses its uniform structure and coloration, and presents the appearance of a reseau, i. e. colored agglomerations, insulated from each other by practically colorless spaces, become visible. In other words, the very fine pigments incorporated after grinding appear agglomerated together in small isolated groups.

I have found that I can overcome the above-mentioned disadvantages and produce a suitable pigmented composition containing a cellulose derivative in which the pigments are homogeneously distributed and dispersed by forcing a mixture of a finely divided pigment and a solution of the type hereafter more particularly explained through relatively small orifices under pressure.

It is therefore an object of this invention to provide a method of preparing a solution containing a cellulose derivative and a pigment dispersed therein, said solution being substantially stable and homogeneous and suitable for use as a coating composition, spinning solution, or the like.

Another object of this invention is to provide a process of producing a cellulosic composition of the type referred to, which comprises forcing a mixture of a finely divided pigment and a solution through relatively small orifices under pressure of 50 to 1000 kgs. per $cm^2$.

A further object of this invention is to provide a method of preparing a stable and homogeneous pigmented cellulose derivative composition by mixing a finely divided insoluble pigment in a solution comprising either a cellulosic derivative solvent or solvent mixture, with or without a cellulose derivative dissolved therein, or a portion of a previously pigmented composition, forcing the resultant mass through relatively small orifices under pressure from 50 to 1000 kgs. per $cm^2$., and subsequently adding a cellulose derivative to produce the desired concentration.

Other objects will appear from the following description and appended claims.

According to the present invention, a pigmented cellulosic composition is produced by incorporating a finely divided pigment in a solution and forcing the resultant suspension through relatively small orifices under pressure.

The solution with which the pigment is mixed prior to distribution may comprise a cellulose derivative dissolved in a solvent or solvent mixture. If the concentration of the cellulose derivative is less than that desired in the final product, an additional quantity of the cellulose derivative may be added and dissolved in the composition subsequent to the dispersion of the pigment therein. The solution may also be the solvent or solvent mixture per se, in which event the final composition is prepared by dissolving the required quantity of the cellulose derivative in the composition resulting from the homogenizing treatment. Instead of adding a cellulose derivative as above described, a solution thereof and of suitable contration may be added to produce the product of the desired concentration. In some instances, if the viscosity permits, a portion of a previously-prepared final product may be used as the solution in which the pigment is mixed and dispersed.

The pressure under which the dispersing is effected may vary within wide limits. Generally, however, pressures varying from betwen 50 to 1000 kgs. per $cm^2$, have produced satisfactory results. I prefer, however, to employ pressures varying from 100 to 300 kgs. per $cm^2$.

The size and shape of the orifices may also vary. Circular orifices of about 0.8 mm., more or less, in diameter have given satisfactory results. Rectangular orifices consisting of slots having widths of 0.005 to .10 mm., and preferably 0.01 to 0.03 mm., have also given satisfactory results.

The following examples, which it is understood are in no way limitative of the invention, are given as illustrations in order to clearly explain the invention, the parts being by weight:

*Example I.*—Two parts of nitro-cellulose are dissolved in 98 parts of a solvent consisting of 39 parts of alcohol and 59 parts of ether. To this dilute collodion 1.2 parts of finely precipitated barium sulphate is added. After a preliminary rough dispersion of the barium sulphate in the collodion by stirring in a mixer, the latter is forced through a circular orifice of about 0.8 mm. in diameter, the rate of flow being 300 liters per hour under a pressure of 350 to 400 kgs. per cm$^2$. After performing this forcing operation three times, a white varnish is obtained, the covering power and the luster of which are very high.

*Example II.*—To a solution of 1 part of cellulose acetate and 98 parts of a solvent (consisting of 80 parts of acetone, 16 parts of ethyl alcohol, 1 part of ethyl lactate, and 1 part of triacetin), 1 part of freshly precipitated Prussion blue is added with energetic stirring. The dilute collodion so obtained is forced through a rectangular orifice of 2 x 0.5 mm., so that under a pressure of 150 to 200 kgs. per cm$^2$. a rate of flow of 500 liters per hour is obtained. After performing this forcing operation five times, the collodion is poured into a mixer containing 15 parts of cellulose acetate. The mixture is stirred until the newly added cellulose acetate is completely dissolved, and a collodion is obtained ready for use in the manufacture of films.

This collodion may be filtered in the manner usually employed in the industry, the filtered collodion having practically the same Prussion blue content as the collodion previous to filtration.

The film obtained is of a beautiful blue color, substantially perfectly uniform and, when seen by transparence, its aspect is substantially perfectly regular.

*Example III.*—To 98 parts of a solvent constituted by 20 parts of acetol, 16 parts of ethyl alcohol, 1 part of ethyl lactate and 1 part of triacetin, 1 part of Prussian blue, freshly prepared, is added, and the mixture is energetically stirred. The liquor so obtained is forced through a rectangular orifice of 2 x 0.5 mm. under a pressure of 130 to 150 kgs. per cm$^2$., the rate of flow beng 450 liters per hour. After repeating this forcing operation five times, the resulting liquor is inserted in a mixer containing 16 parts of cellulose acetate, and the mixture is stirred until the cellulose acetate is completely dissolved. A collodion is obtained in this manner which is at once available for manufacturing films.

The collodion is then treated as indicated in the Example 2, above.

*Example IV.*—To a collodion prepared with 2 parts of cellulose butyrate and 98 parts of acetone, 2 parts of lamp black and 0.8 part of freshly precipitated nickel sulphide are introduced (after dissolution of the cellulose butyrate). The fillers are roughly dispersed in the suspension by stirring and the mixture is forced through a thin orifice of about 0.9 mm. in diameter, so that the rate of flow is 500 liters per hour under a pressure of 500 kgs. per cm$^2$. After being forced through this orifice five times, the collodion becomes a beautiful black color, and the suspension does not form any sediment; it can be used for the preparation of a more concentrated collodion for spinning artificial silk, for instance, by pouring it into a mixer containing about 16 parts of cellulose butyrate. After dissolution and dispersion of this collodion, it is spun as customary in the artificial silk industry.

The thread obtained possesses serimetric qualities sensibly equal to those of non-colored thread and is remarkably brilliant.

*Example V.*—A solution is prepared as described in Example 2. The dilute collodion thus obtained is forced through an opening in the form of a slot 3 cm. long and from .01 to .02 mm. wide, in such a manner that under a pressure of 100 kgs. per cm$^2$. a rate of flow of 75 liters per hour is obtained. This operation is repeated five times. The solution obtained is employed as in Example 2.

The characteristic feature of the invention, that is, the forcing of the suspension under high pressure through very small orifices, may be advantageously carried out in the presence of dispersing agents, such as, for example, sugars, glycerin or salts. This operation may be carried out at ordinary temperature or at a more elevated temperature. It may be advantageous to heat the solution at the moment of the homogenization treatment and to cool it immediately afterwards.

The colored solutions obtained by this process show, under microscopic examination with a high magnification, a very regular and very fine distribution of the pigments, and this distribution does not suffer any modification, even if the solution is kept for several days before use.

As a result, the colored solutions prepared in this manner have the advantage of being capable of being kept and of giving an intense and bright coloration, while using lesser quantities of pigments than hitherto necessary.

The products manufactured with such solutions, such as varnishes, or artificial films or filaments, possess and maintain remarkable brightness without having the bronzed sheen that is generally noticeable when a material colored by pigmentation is observed by reflected light.

Finally, the mechanical properties of the films or fibers obtained by means of these solutions do not differ sensibly from those possessed by uncolored films or fibers. Particularly, the elongation at breaking is not diminished.

In the manufacture of fibers or films, the solutions prepared by the present process may be filtered as effectively as uncolored solutions. The filter does not clog as rapidly and the pigment content of the filtrated solution is the same as that of the solution before filtration.

Since it is obvious that various changes and modifications may be made in the specific details above set forth without departing from the nature or spirit of this invention, I do not intend to limit myself thereto except as defined in the appended claims.

I claim:

1. In a process of preparing a stable pigmented liquid composition containing a cellulose derivative and suitable for varnishes, lacquers, spinning solutions and the like, the steps which comprise uniformly and homogeneously dispersing a finely divided pigment in a solvent for a cellulose derivative by forcing a mixture of the materials through small orifices under pressure and then adding a cellulose derivative in an amount sufficient to produce the desired concentration in the final product.

2. In a process of preparing a stable pigmented liquid composition containing a cellulose derivative and suitable for varnishes, lacquers, spinning solutions and the like, the steps which comprise uniformly and homogeneously dispersing a finely divided pigment in a solution containing a cellulose derivative by forcing a mixture of the materials through small orifices under pressure and then adding a cellulose derivative in an amount sufficient to produce the desired concentration in the final product.

3. In a process of preparing a stable pigmented liquid composition containing a cellulose derivative and suitable for varnishes, lacquers, spinning solutions and the like, the steps which comprise uniformly and homogeneously dispersing a finely divided pigment in a solvent for a cellulose derivative by forcing a mixture of the materials through small orifices under pressure of from 50 to 1000 kgs. per cm$^2$. and then adding a cellulose derivative in an amount sufficient to produce the desired concentration in the final product.

4. In a process of preparing a stable pigmented liquid composition containing a cellulose derivative and suitable for varnishes, lacquers, spinning solutions and the like, the steps which comprise uniformly and homogeneously dispersing a finely divided pigment in a solution containing a cellulose derivative by forcing a mixture of the materials through small orifices under pressure of from 50 to 1000 kgs. per cm$^2$. and then adding a cellulose derivative in an amount sufficient to produce the desired concentration in the final product.

5. In a process, the step which comprises forcing a mixture of a finely divided pigment and a solution containing a cellulose derivative through small orifices under pressure to produce a stable liquid composition in which the pigment is uniformly and homogeneously distributed and dispersed therein and does not agglomerate on standing.

6. In a process, the step which comprises forcing a mixture of a finely divided pigment and a solution containing a cellulose derivative through small orifices under pressure to produce a stable liquid composition from 50 to 1000 kgs. per cm$^2$. in which the pigment is uniformly and homogeneously distributed and dispersed therein and does not agglomerate on standing.

JEAN LADRETTE.